(12) United States Patent
Villiers

(10) Patent No.: US 12,032,388 B2
(45) Date of Patent: Jul. 9, 2024

(54) GUIDANCE SYSTEM FOR LANDING A DRONE

(71) Applicant: HOVERSEEN, Paris (FR)

(72) Inventor: Eric Villiers, Paris (FR)

(73) Assignee: HOVERSEEN, Paris (FR)

( * ) Notice: Subject to any disclaimer, the term of this patent is extended or adjusted under 35 U.S.C. 154(b) by 497 days.

(21) Appl. No.: 17/298,486

(22) PCT Filed: Dec. 4, 2019

(86) PCT No.: PCT/EP2019/083659
§ 371 (c)(1),
(2) Date: May 28, 2021

(87) PCT Pub. No.: WO2020/115123
PCT Pub. Date: Jun. 11, 2020

(65) Prior Publication Data
US 2022/0019243 A1    Jan. 20, 2022

(30) Foreign Application Priority Data

Dec. 6, 2018 (FR) .................................. 1872444

(51) Int. Cl.
*G05D 1/00* (2024.01)
*B64C 39/02* (2023.01)
(Continued)

(52) U.S. Cl.
CPC ......... *G05D 1/0676* (2013.01); *B64C 39/024* (2013.01); *B64D 47/06* (2013.01);
(Continued)

(58) Field of Classification Search
CPC ...... G05D 1/0676; G05D 1/0858; G06T 7/70; B64C 39/024; B64D 47/06; B64D 2203/00; B64U 2201/20; B64U 70/00; B64U 50/19
See application file for complete search history.

(56) References Cited

U.S. PATENT DOCUMENTS 10,279,906 B2 * 5/2019 Levien .................. B64C 39/024
2015/0051758 A1 2/2015 Cho
(Continued)

OTHER PUBLICATIONS

Search Report from the French Intellectual Property Office on corresponding FR application (FR1872444) dated Sep. 26, 2019.
(Continued)

*Primary Examiner* — Aryan E Weisenfeld
(74) *Attorney, Agent, or Firm* — Alumen IP Law PC

(57) ABSTRACT

The invention relates to a method for automatically guiding a drone with a computer, with a view to landing the drone on a docking and recharging platform, the drone comprising a first luminous means that emits a first light signal and a second luminous means that emits a second light signal different from the first light signal, the first luminous means and the second luminous means being fastened at two separate points to the drone, the station receiving images captured by a camera, said method comprising: —analyzing the images captured by the camera so as to locate the first and second luminous means, —determining the position and orientation of the drone depending on the determined position of the first and second luminous means, —generating, with the computer, piloting instructions intended for the drone, said instructions being configured to guide the drone towards the docking and recharging platform, —transmitting said instructions to the drone, —the drone receiving and implementing said instructions.

7 Claims, 3 Drawing Sheets

(51) Int. Cl.
*B64D 47/06* (2006.01)
*G06T 7/70* (2017.01)
*B64U 50/19* (2023.01)
*B64U 70/00* (2023.01)

(52) U.S. Cl.
CPC ............. *G05D 1/0858* (2013.01); *G06T 7/70* (2017.01); *B64D 2203/00* (2013.01); *B64U 50/19* (2023.01); *B64U 70/00* (2023.01); *B64U 2201/20* (2023.01)

(56) References Cited

U.S. PATENT DOCUMENTS

| | | |
|---|---|---|
| 2015/0158598 A1 | 6/2015 | You |
| 2016/0001883 A1* | 1/2016 | Sanz .................... H02J 7/0044 244/17.23 |
| 2016/0039541 A1* | 2/2016 | Beardsley ............ G05D 1/0088 701/2 |
| 2016/0259333 A1 | 9/2016 | Ducharme |
| 2018/0237161 A1 | 8/2018 | Minnick et al. |

OTHER PUBLICATIONS

International Search Report and Written Opinion on corresponding PCT application (PCT/EP2019/083659) from International Searching Authority (EPO) dated Feb. 17, 2020.

\* cited by examiner

GUIDANCE SYSTEM FOR LANDING A DRONE

TECHNICAL FIELD

The present invention is concerned with the field of aerial drones, otherwise known as unmanned aerial vehicles. More precisely, the present invention is directed to the automatic flight management of drones, in particular in the landing phase.

BACKGROUND

As is known, a drone can be piloted via a remote control or be configured to automatically manage its flight.

In particular, automatic drones are nowadays configured to automatically follow a flight plan, for example for the purpose of monitoring a zone. Such drones, with an electric motorization system powered by one or more batteries or other means of accumulation, should regularly return to their base to connect to a docking and recharging platform in order to recharge their battery(ies).

This operation is generally carried out via a "base" on the ground, which sometimes combines the functions of protection against bad weather and battery charge management. According to the invention, such a base can provide management of the automatic piloting of the drone, by means of a computer.

In order to recharge a drone battery, it is thus necessary to connect its battery to a charger arranged on a docking and recharging platform (belonging to the "base"), respecting the respective polarities of the charger and battery.

FIGS. 1 to 3 thus show a drone 1 and a docking and recharging platform 2, respectively seen from above with the drone 1 next to the platform 2, seen from above with the drone 1 vertically aligned on the platform 2, and seen from the side with the drone 1 in the final phase of approaching the platform 2.

To make required electrical connections between the drone 1 and the docking and recharging platform 2, it is especially possible to use "legs" 13A to 13D of the drone 1, said legs comprising, at their free end, respective electrical connectors 11A to 11D, it being provided that each electrical connector 11A, 11B, 11C, 11D should be positioned in contact with the corresponding electrical connector 21A, 21B, 21C, 21D, in other words in contact with a corresponding contact zone allowing the establishment of the adequate electrical connection of the battery of the drone 1 with the electrical charger of the docking and recharging platform 2, so as to respect the polarities.

For example, a Lithium Polymer battery, also called LiPo battery, with three 3S type cells, requires, as represented in the figures, 4 distinct electrical connections to the electrical charger of the docking and recharging platform 2.

In order for the legs—electrical connectors 11A to 11D—of the drone 1 to connect to the corresponding electrical connectors 21A to 21D of the docking and recharging platform 2, said legs 11A to 11D should be brought into contact with the electrical connectors 21A to 21D of the charger of the docking and recharging platform 2.

In other words, the legs 13A to 13D should be put on the respective adequate zones, once the drone 1 is put on the docking and recharging platform 2.

To this end, the skilled person would contemplate using a mechanical system configured to move the drone, once the latter is put in proximity to the charger, in order to correctly position said drone and its electrical connectors on the corresponding electrical connectors of the charger of the docking and recharging platform.

According to the state of the art, it is also possible, as described in document WO 2017/044798 A1, to make a funnel-shaped guide at the docking and recharging platform. This guide brings the legs—electrical connectors of the drone onto the corresponding electrical connectors of the charger. Such a guide extends vertically and implies a docking station with a large volume.

These known solutions have various drawbacks. First of all, they imply an autonomous automatic guidance that is sufficiently precise to either be put close enough to the mechanical arm, or to allow a landing on the funnel-shaped guide. Furthermore, they generate a great mechanical complexity for the arm supposed to handle the drone, and/or a large overall size, especially for the docking and recharging platform equipped with a guide in the shape of a cone or a pyramid with a rectangular base. The complexity generates additional costs, risks of breakdowns and requires precautions of use; the overall size generates difficulties, especially, to transport the drone.

There is therefore a need for a method for guiding a drone in automatic flight, which allows the fine landing of a drone on a docking and recharging platform, taking account of the appropriate orientation of the drone and the electrical connectors it comprises with respect to the corresponding electrical connectors to which said drone should connect in order to recharge an onboard battery. Thus, an automatic drone can be interfaced with a satellite geo-positioning system (GPS, Galileo, etc.) throughout its mission. According to the invention, when said drone has to return to its base, for example to recharge its battery on a docking and recharging platform, the geo-positioning system allows the drone to position itself in proximity to said docking platform, still in flight, and then the guidance of the drone during the landing phase is carried out by means of a computer connected to a camera installed at the docking platform. The camera captures images of the drone in flight and the computer determines the relative position of the drone by locating the position of two distinguishable light sources installed at two distinct points on the drone. The computer then determines piloting instructions for the drone to bring it to land, especially in a suitable position, onto the docking platform.

Document US 2016039541 A1 discloses another system for assisting the landing of a drone, in this case a "multi-copter", according to which said multicopter comprises a special reinforcement comprising light sources forming a particular recognizable pattern, and the docking platform comprises a camera and means for recognizing said pattern, as well as means for sending sets of control data to the multicopter in order to assist in the automatic piloting of said multicopter during a landing phase.

However, the system described in this document requires the installation on the drone, or more precisely under the drone, of a frame, on which LEDs are especially arranged, said frame protruding from the drone by at least 20% in width, which makes said drone less maneuverable, in particular when dealing with small and low-power drones. The position of such a frame also creates a hindrance for the use of an on-board camera, for example, because portions of the frame, especially, can enter the field of view of such an on-board camera.

Furthermore, the system and the method described in this document should also be made more robust, especially with respect to any inaccuracy in determining the position of the drone or in making the piloting commands by said drone.

It is therefore the object of the present invention to resolve these drawbacks, especially by dispensing with any element overloading the drone or requiring modification of its structure or on-board software.

SUMMARY OF THE INVENTION

The invention is directed to a method for automatically guiding a drone by means of a computer, in order to carry out landing of the drone on a docking and recharging platform, the drone comprising a first light means emitting a first light signal and a second light means emitting a second light signal different from the first light signal, the first light means and the second light means being attached at two distinct points of the drone, the station receiving images captured by a camera filming a delimited space comprising a volume overhanging the docking and recharging platform, the drone and the computer having communication means enabling them to communicate directly with each other, said method comprising the following steps of:

when the drone enters the delimited space with a view to landing on the docking and recharging platform, analyzing the images captured by the camera, said images comprising the drone, to identify the first light signal and the second light signal and thus locate the first and second light means determining the position and orientation of the drone according to the position determined of the first and second light means, generating, by the computer, piloting instructions intended for the drone, configured to guide it towards the docking and recharging platform, emitting said control instructions to the drone, receiving and implementing said instructions by the drone, the control instructions comprising instructions for bringing the drone into hovering flight in vertical alignment with the center of the docking and recharging platform, followed by instructions for descending the drone towards the docking and recharging platform until the drone lands.

By virtue of the invention, the drone is thus automatically piloted, especially from a base, so as to be able to land precisely on the docking and recharging platform, especially in a position and with an orientation adapted with a view to recharging the battery of said drone.

According to one embodiment, the control instructions comprise throttle and attitude instructions.

According to one embodiment, the piloting instructions comprise, upon implementing the descent instructions by the drone, if the position of said drone with respect to the vertical alignment of the center of the docking and recharging platform deviates beyond a predefined tolerance, especially beyond 15° or beyond 30°, along the axes considered, an instruction for stopping the descent of the drone is generated, emitted and implemented by the drone, then piloting instructions are generated, emitted and implemented by the drone so as to reposition said drone in hovering flight in vertical alignment with the center of the docking and recharging platform, then instructions for descent of the drone towards the docking and recharging platform are generated, emitted and implemented by the drone.

According to one embodiment, the method comprises, if the drone leaves the delimited space, emitting a piloting instruction comprising an instruction to ascend the drone to the vertical of its position.

According to one embodiment, the delimited space is a cone or a pyramid with a rectangular base, the apex of which is the camera located at the center of the docking and recharging platform.

According to one embodiment, the method comprises, when the drone implements instructions, said instructions comprising instructions aiming at bringing said drone in hovering flight in vertical alignment with the center of the docking and recharging platform, if the images captured by the camera do not make it possible to identify the first light signal and the second light signal of the drone, then the computer generates and emits predefined piloting instructions to the drone so that it describes a spiral movement in the horizontal plane, this movement being configured to lead said drone to penetrate the delimited space.

The invention is also directed to a drone system, comprising a drone, a docking and recharging platform and a computer configured to implement the method as briefly described previously, the drone comprising a first light means emitting a first light signal and a second light means emitting a second light signal different from the first light signal, wherein the first and second light means are attached to the drone on either side of a longitudinal axis of the drone.

According to one embodiment, the docking and recharging platform comprises an electrical charger having electrical connectors and the drone comprises complementary electrical connectors, said electrical connectors of the drone and the electrical connectors having a respective polarity, and the control instructions being configured to respect the polarities when the drone lands.

BRIEF DESCRIPTION OF THE DRAWINGS

The invention will be better understood upon reading the following description, given only by way of example, and referring to the appended drawings given as non-limiting examples, in which identical references are given to similar objects and in which.

It should be noted that the figures set out the invention in detail to implement the invention, said figures being of course able to serve to better define the invention if necessary.

DETAILED DESCRIPTION

Figure 1:
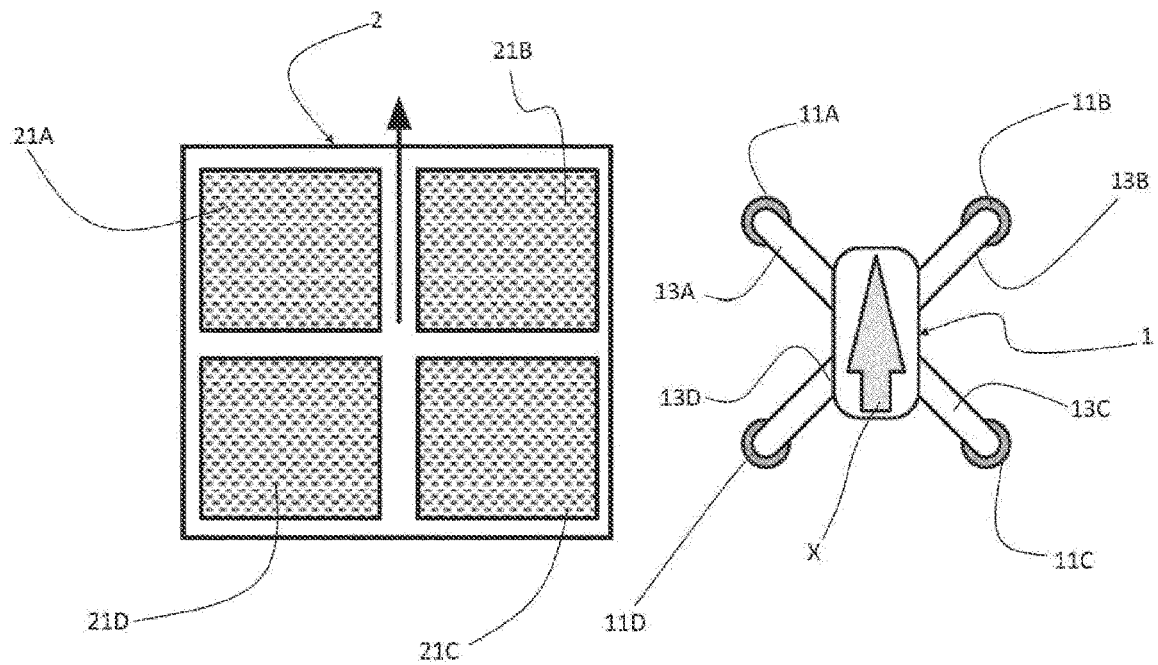
FIG. 1 (already discussed) schematically illustrates a drone and a docking and recharging platform.
Figure 2:
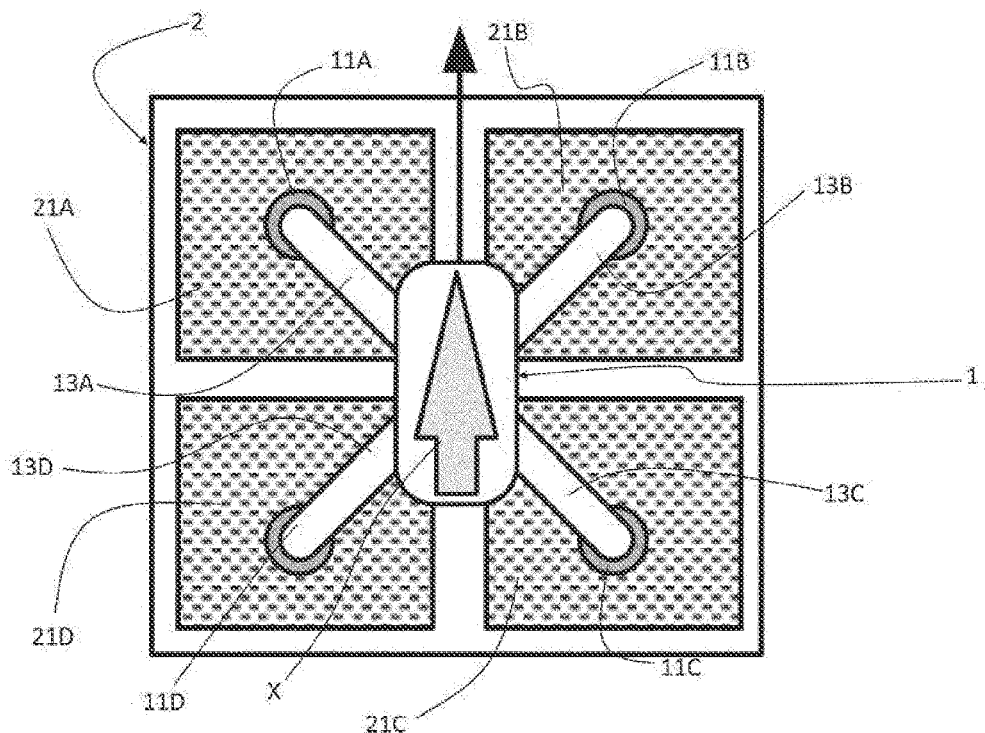
FIG. 2 (already discussed) schematically illustrates a drone put on a docking and charging platform.
Figure 3:
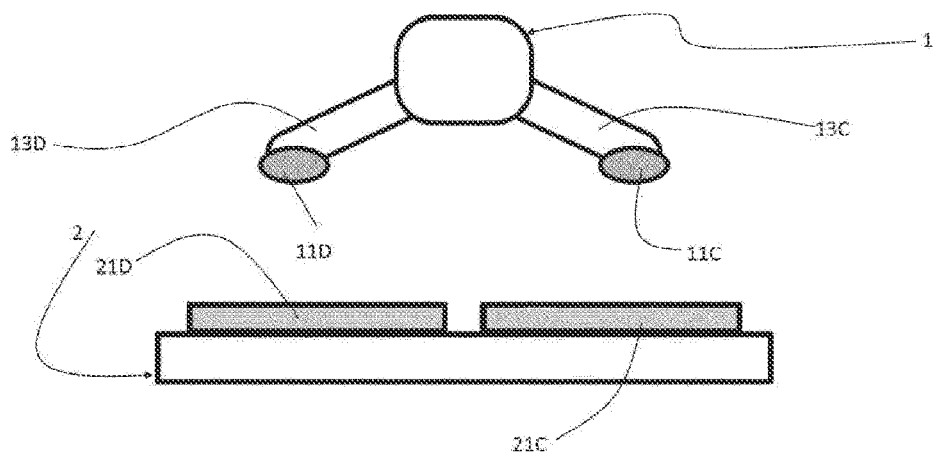
FIG. 3 (already discussed) shows a drone, from the front, in the final approach phase to a docking and recharging platform.
Figure 4:
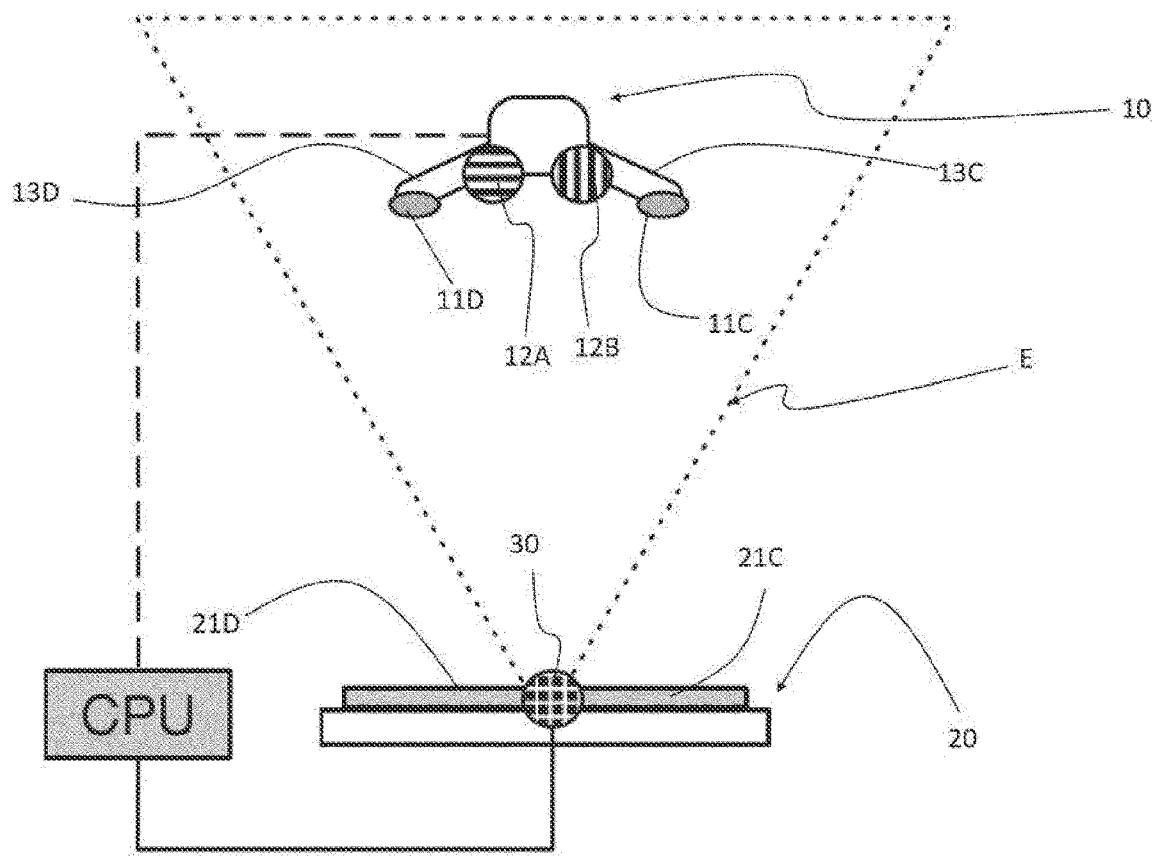
FIG. 4 represents, in accordance with the invention, a drone equipped with distinguishable light means, piloted by a computer from images captured from said drone.
Figure 5:
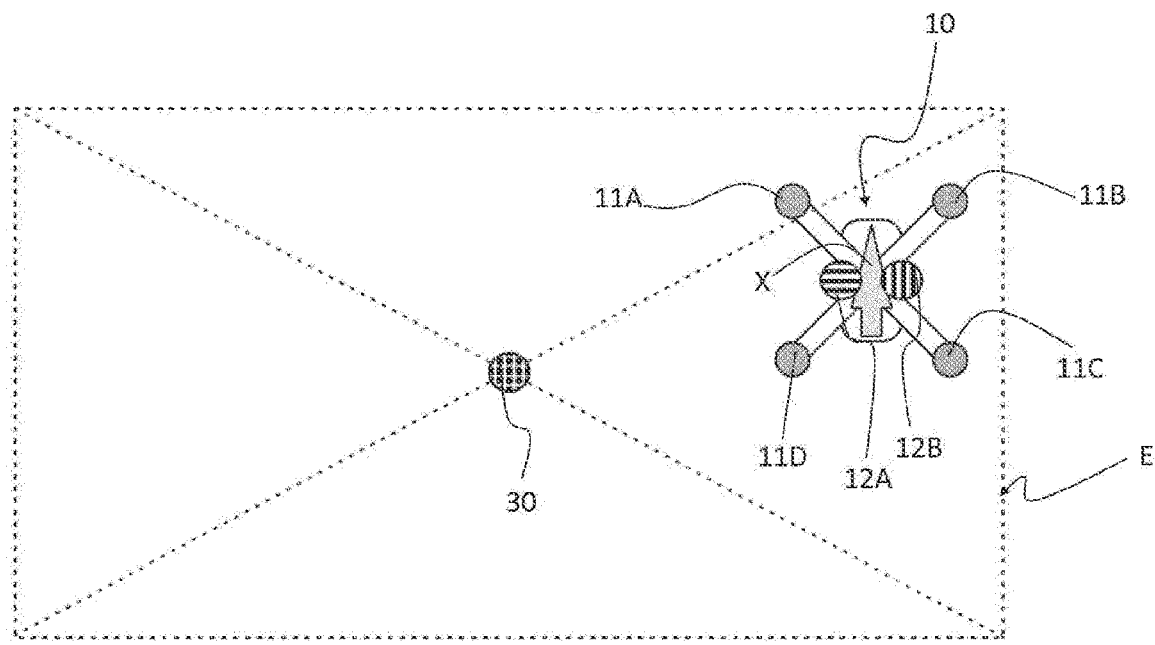
FIG. 5 schematically illustrates, in a bottom view, a delimited space captured by the camera, in which the drone is located.

FIGS. 4 and 5 represent schematic views of drone systems enabling the implementation of the invention.

The method according to the invention allows a precise positioning of the drone 10 on the docking platform 20 when the drone returns to said docking platform, especially for the purpose of recharging its battery.

The implementation of the method according to the invention allows the fine automatic piloting of the drone 10, in the landing phase, until it is put onto the docking and recharging platform 20. The method according to the invention allows the drone to be put with a precision that thus allows the legs 13A to 13D of the drone 10 to be placed, said legs being provided with electrical contacts forming electrical connectors 11A to 11D of the drone 10, onto contact zones, especially having metal surfaces, forming electrical connectors 21A to 21D of the charger of the docking and recharging platform 20, allowing an electrical connection between the battery of the drone 10 and the charger to be established.

The invention thus makes it possible to charge the battery without involving a mechanical placement system, which is a source of possible malfunctions, while limiting the overall size of the platform in the absence of vertical mechanical guide means.

To this end, with reference in particular to FIG. 4, the invention is based on a drone 10 that can be remotely controlled, via communication means, for example by means of a radio link, said drone 10 being equipped with at least two distinguishable light means, especially of different colors and/or shapes. For example, these light means may be light emitting diodes, comprising at least one light emitting diode emitting a red light and at least one light emitting diode emitting a green light, said red and green light emitting diodes being respectively attached to the drone 10 at two different points, especially on either side of a longitudinal axis X of the drone 10.

Still according to the invention and with reference especially to FIG. 4, a camera 30 is installed on the ground and oriented so as to film a delimited space E configured to comprise the drone in its final approach and landing phase. The delimited space E corresponds to a detection zone: when the drone penetrates this delimited space E, it is locatable because it is filmed by the camera 30, which allows the implementation of the method according to the invention.

According to one embodiment, the camera 30 is installed at the docking and recharging platform 20 and oriented vertically towards the sky. The camera 30 captures images corresponding to the delimited space E, shaped like a pyramid with a rectangular base, configured to comprise the drone 10 in its final phase of approach and landing on the docking and recharging platform 20.

The system for implementing the method according to the invention further comprises a computer CPU, schematically represented in FIG. 5. The computer CPU provides processing and analysis of the images captured by the camera 30. The computer CPU is connected to the camera 30 and to the drone 10 by adapted communication means.

The computer CPU is configured to communicate with the drone 10 and to send it piloting instructions. It should be noted that the implementation of the method according to the invention does not require any modification of the on-board software of the drone 10 when the latter is chosen off the shelf. The only prerequisite is that the drone has communication means to receive piloting instructions.

The drone 10 comprises light means 12A, 12B, emitting a light signal distinguishable from each other and arranged on the drone 10 at two distinct points, as represented in FIGS. 4 and 5.

For example, it may be red and green light emitting diodes arranged on either side of a longitudinal axis of the drone 10. It may also be other types of light sources, especially in terms of color or shape, arranged at two distinct points of the drone 10.

In the case where the light means 12A, 12B are respectively red and green light sources arranged on either side of the longitudinal axis X of the drone 10, the CPU can distinguish the right from the left of the drone, in addition to the position in space. As a result, the computer CPU is configured to determine piloting instructions allowing to automatically guide the drone 10 to the docking and recharging platform 20 and to put it there in a direction adapted so that the electrical connectors 11A to 11D of the drone 10 are in contact, while respecting the polarities, with the electrical connectors 21A to 21D of the docking and recharging platform 20 with a view to ensuring recharging of the battery of the drone 10.

Thus, in summary, to implement the method according to the invention, a drone equipped with distinguishable light means 12A, 12B, located at two distinct points of said drone 10, visible from the outside by a camera 30 located on the ground, is required. In particular, according to one embodiment, said light means 12A, 12B are attached to the drone 10 on either side of a longitudinal axis X of said drone 10.

A computer CPU is configured to receive and analyze the images captured by the camera 30 and to determine the position and orientation of the drone 10 by virtue of locating said light means 12A, 12B. As the position of the docking and recharging platform 20 is known to the computer CPU, said computer CPU determines the piloting instructions to be applied by the drone 10 so that the latter comes to be put onto the docking and recharging platform 20 in a position adapted so that the electrical connectors 11A to 11D of the drone are in contact with the electrical connectors 21A to 21D of the docking and recharging platform, while respecting the polarities of the charger and battery of the drone 10.

The computer CPU thus implements a communication protocol with the drone 10 allowing transfer and implementation of adapted piloting instructions.

More precisely, still referring to FIGS. 4 and 5, the camera 30 is for example installed at the docking and recharging platform 20, especially at the center of said platform, and films a delimited space E overhanging said docking and recharging platform 20. The delimited space E has, for example, the shape of a pyramid with a rectangular base having as its apex, by definition, the camera 30.

When the drone 10 enters the delimited space E with the objective of being put onto the docking and recharging platform 20, especially with a view to recharging its battery, the method according to the invention provides for the automatic piloting of the drone 10 by the computer CPU.

The computer CPU receives the images captured by the camera 30, by means of adapted communication means, and determines the position of the light means 12A, 12B in a horizontal plane above the camera 30, inside the delimited space E in the shape of a pyramid with a rectangular base of view of the camera 30. From the positions of the light means 12A, 12B, the computer CPU determines the position of the drone 10 in space and thus the relative position of the drone 10 in the plane above the camera 30, and thus the relative position of the drone 10 with respect to the docking and charging platform 20.

The computer CPU then determines the piloting instructions for the drone 10. According to one embodiment, the method according to the invention provides that said piloting instructions are configured so that the drone remains, initially, in hovering flight above the center of the docking and recharging platform, said center being able to be the same as the position of the camera 30.

In FIG. 5, in a bottom view, the computer CPU brings the drone 10 to the left and then downwards to position it above the center of the docking and recharging platform, which corresponds to the position of the camera 30 in this case.

Once the drone 10 is in position, in vertical alignment with the center of the docking and recharging platform 20, in particular after a hovering phase as described above, its altitude is progressively lowered until it reaches an altitude at which the computer CPU commands it to land, for example by cutting off its motorization means, especially by stopping rotors with which it is equipped. The piloting instructions thus comprise, especially, throttle, attitude, descent and, possibly, ascent instructions.

According to one exemplary embodiment, when lowering the altitude of the drone, if its position with respect to the vertical alignment of the center of the docking and recharging platform 20 deviates beyond a predefined tolerance, for example beyond 15°, the descent can be stopped and the drone 10 can be repositioned in hovering flight in vertical alignment with the center of the docking and recharging platform 20, and then the automatic landing method according to the invention resumes its course.

In case the drone 10 involuntarily leaves the delimited space E, the computer CPU can send to the drone an instruction for ascending the drone 10 or an instruction for returning to its initial position, where the method according to the invention for the automatic landing of the drone had been started.

Other alternative embodiments are provided depending on the course and stability of the hovering flight of the drone 10 in vertical alignment with the docking and recharging platform 20 and depending on the exact trajectory followed by the drone from its descent towards the docking and recharging platform 20. The piloting instructions determined by the computer CPU are thus subject to updates, as a function of feedback loops taking account of inaccuracies in the execution of the piloting instructions, inaccuracies in the satellite geo-positioning system, as a function of inaccuracies in the determination of the altitude of the drone, as a function of the wind, in particular the cross wind, etc. In particular, the first and second light means can be used also to determine the precise altitude of the drone in the last meters, where the accuracy of the on-board geo-positioning systems may be insufficient. Using the known spacing of the first and second light means, the distance between the drone and the camera is determined. To compute the altitude of the drone, the angle of the drone to the horizontal on the axis defined by the first and second light means is taken into account. This angle comes from the compensation by the drone of the cross wind when it hovers.

Especially, when the drone 10 undertakes to position itself in the delimited space E with the objective of being put onto the docking and recharging platform 20, if the camera 30 does not allow the drone 10 to be located, for example if the precision of the satellite geo-positioning system is insufficient for the drone, in autonomous guidance mode, actually reach the interior of the delimited space E, then the computer CPU can send predefined piloting instructions to the drone 10 so that it describes a spiral movement in the horizontal plane, this movement being configured to lead said drone 10 to penetrate the delimited space E.

The invention claimed is:

1. A method for automatically guiding a drone by means of a computer, for performing landing of the drone on a docking and recharging platform, the drone comprising a first light means emitting a first light signal and a second light means emitting a second light signal different from the first light signal, the first light means and the second light means being attached at two distinct points of the drone, images captured by a camera of a delimited space comprising a volume overhanging the docking and recharging platform, the drone and the computer having communication means enabling the drone and the computer to communicate directly with each other, said method comprising:

when the drone enters the delimited space with a view to landing on the docking and recharging platform, analyzing the images captured by the camera, said images comprising the drone, in order to identify the first light signal and the second light signal and thus determine a position of the first and second light means, determining a position and an orientation of the drone according to the position determined of the first and second light means, generating, by the computer, piloting instructions intended for the drone to guide the drone towards the docking and recharging platform, emitting control instructions to the drone, receiving and implementing said control instructions by the drone, wherein said control instructions comprising instructions for bringing the drone into hovering flight in vertical alignment with a center of the docking and recharging platform followed by instructions for descending the drone towards the docking and recharging platform until said drone lands, and wherein, when the drone implements said piloting instructions, said piloting instructions comprising instructions aimed at bringing said drone into hovering flight in vertical alignment with the center of the docking and recharging platform, if the images captured by the camera do not make it possible to identify the first light signal and the second light signal of the drone, then the computer generates and emits predefined piloting instructions to the drone that describe a spiral movement in the horizontal plane, the spiral movement being configured to lead said drone to penetrate the delimited space.

2. The method of claim 1, wherein the piloting instructions comprise throttle and altitude instructions.

3. The method according to claim 1, wherein the piloting instructions comprise, upon implementing instructions for descending by the drone, if the position of said drone with respect to the vertical alignment of the center of the docking and recharging platform deviates beyond a predefined tolerance, an instruction to stop descending of the drone is generated, emitted and implemented by the drone, then piloting instructions are generated, emitted and implemented by the drone so as to reposition said drone in hovering flight in vertical alignment with the center of the docking and recharging platform, and then instructions for descent of the drone towards the docking and recharging platform are generated, emitted and implemented by the drone.

4. The method according to claim 1, comprising, if the drone leaves the delimited space, emitting a piloting instruction comprising an instruction for the drone to ascend to the vertical of its position.

5. The method according to claim 1, wherein the delimited space is a cone or a pyramid with a rectangular base, the apex of which is the camera located at the center of the docking and recharging platform.

6. A drone system, comprising a drone, a docking and recharging platform, and a computer configured to implement the method according to claim 1, the drone comprising a first light means for emitting a first light signal and a second light means for emitting a second light signal that is different from the first light signal, wherein the first and second light means are attached to the drone on either side of a longitudinal axis of the drone.

7. The system according to claim 6, wherein the docking and recharging platform comprises an electrical charger having electrical connectors and the drone comprises complementary electrical connectors, said electrical connectors of the drone and the electrical connectors having a respective polarity, and the control instructions being configured to respect the polarities when the drone lands.

\* \* \* \* \*